United States Patent [19]

Taka

[11] Patent Number: 5,930,536
[45] Date of Patent: *Jul. 27, 1999

[54] CAMERA

[75] Inventor: Hideo Taka, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,444

[22] Filed: Jun. 30, 1997

Related U.S. Application Data

[63] Continuation of application No. 08/562,905, Nov. 27, 1995, abandoned.

[30]    Foreign Application Priority Data

Nov. 30, 1994  [JP]  Japan ................................... 6-319515

[51] Int. Cl.⁶ ................................................... G03B 7/26
[52] U.S. Cl. .......................... 396/277; 396/390; 396/409; 396/319

[58] Field of Search .................................... 396/408, 409, 396/389, 390, 277, 280, 319, 301, 302

[56]         References Cited

U.S. PATENT DOCUMENTS

| | | | |
|---|---|---|---|
| 4,685,789 | 8/1987 | Kawamura et al. | 354/173.11 |
| 4,734,732 | 3/1988 | Nishio et al. | 354/173.11 |
| 5,247,321 | 9/1993 | Kazami | 354/106 |
| 5,293,191 | 3/1994 | Umetsu | 354/173.1 |
| 5,325,141 | 6/1994 | Shiina et al. | 354/173.1 |
| 5,365,295 | 11/1994 | Saito et al. | 354/173.1 |

*Primary Examiner*—Safet Metjahic
*Assistant Examiner*—John Chizmar
*Attorney, Agent, or Firm*—Robin, Blecker & Daley

[57]         ABSTRACT

To improve a camera of the kind having the possibility of causing inconveniences such as a double exposure or the like in taking a shot after a battery is replaced and stowed again, a shutter release is allowed after the transport of the film is completed, if a sequence state of the camera obtained when a battery is stowed in the camera is a state before completion of transport of the film.

5 Claims, 8 Drawing Sheets

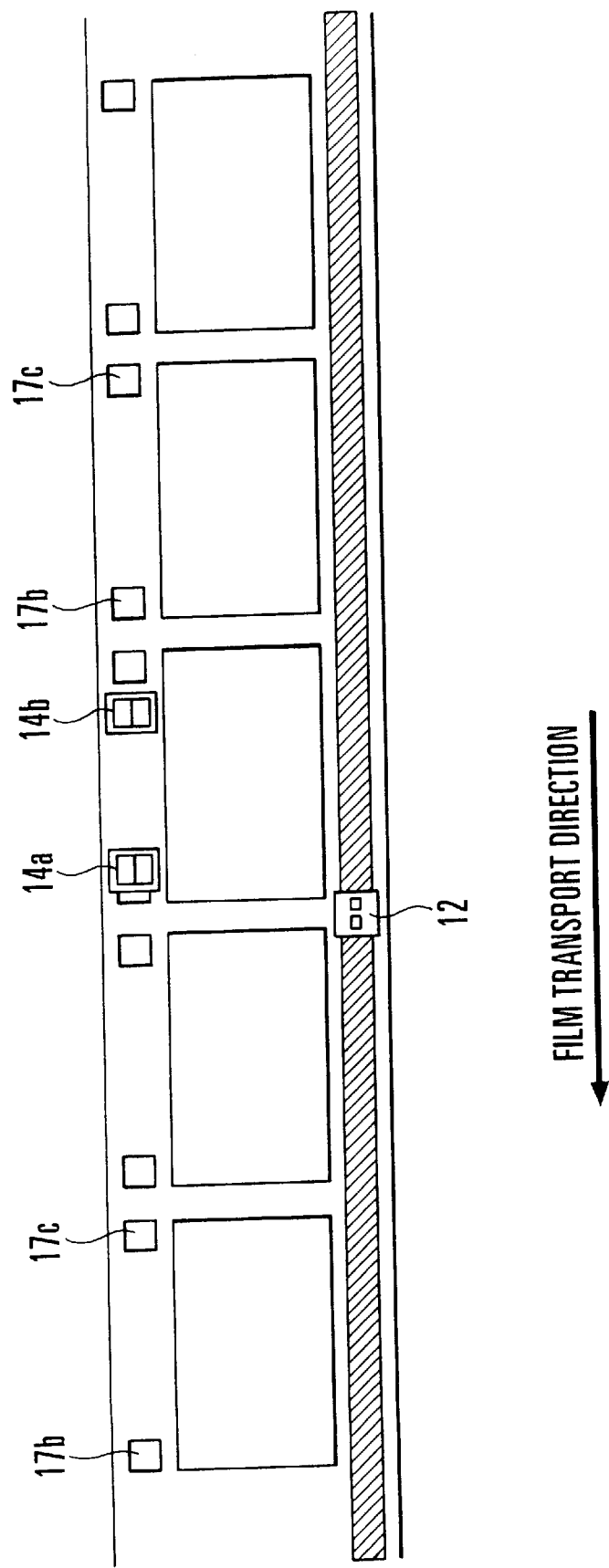

CAMERA

This is a continuation application under 37 CER 1.62 of prior application Ser. No. 08/562,905, filed Nov. 27, 1995, now abandoned.

BACKGROUND OF THE INVENTION

1. Field of the Invention

This invention relates to a camera.

2. Description of the Related Art

It has been known to arrange a camera to begin a film winding action, after a shutter is operated by a release action, and to magnetically record photo-taking (shooting) information in a magnetic recording area of the film while the film is in process of being transported.

However, in cases where an accident such as a drop-off of a power supply battery takes place while a shutter opening/closing action or a film transport action is still in process, the conventional camera of the kind mentioned above has been provided with no arrangement against such accident. The absence of such arrangement has presented the following problems.

(a) After the shutter is operated for a frame of the film, if the power supply drops off and is again turned on, a double exposure is inevitable, as the shutter would be again released for the same frame of the film.

(b) After the commencement of transport of the film, if the power supply drops off and is again turned on before the end of the transport of the film, the magnetic recording tends to be inadequately made, because either a picture taking position deviates from film perforations or the magnetic recording area deviates from the picture taken.

SUMMARY OF THE INVENTION

It is a general object of the invention under the present application to provide a camera arranged to be capable of preventing a double exposure or deviation of a picture-taking position resulting from an accident taking place with respect to a power supply.

It is a more specific object of the invention to provide a camera which is provided with a decision circuit for determining a sequence state of the camera obtained when a battery is stowed in the camera, and is arranged to control an operation of the camera according to the sequence state detected.

It is another object of the invention to provide a camera which is arranged, under the object mentioned above, to inhibit taking a next shot until completion of a film transport action, when the sequence state of the camera is a state between commencement of a photo-taking action and completion of the film transport action to a next frame or is at least a state in which the film transport action is in process.

It is a further object of the invention to provide a camera which is arranged, under the above-stated object, to perform magnetic recording when the sequence state of the camera is a state between commencement of a photo-taking action and completion of a film transport action to a next frame or is at least a state in which the film transport action is in process.

These and further objects and features of the invention will become apparent from the following detailed description of embodiments thereof taken in conjunction with the accompanying drawings.

BRIEF DESCRIPTION OF THE DRAWINGS

FIG. 9 shows the operation of a film position detecting circuit to be included in the camera arranged according to this invention.

DETAILED DESCRIPTION OF THE PREFERRED EMBODIMENTS

Embodiments of this invention are described below with reference to the drawings.

Figure 1:
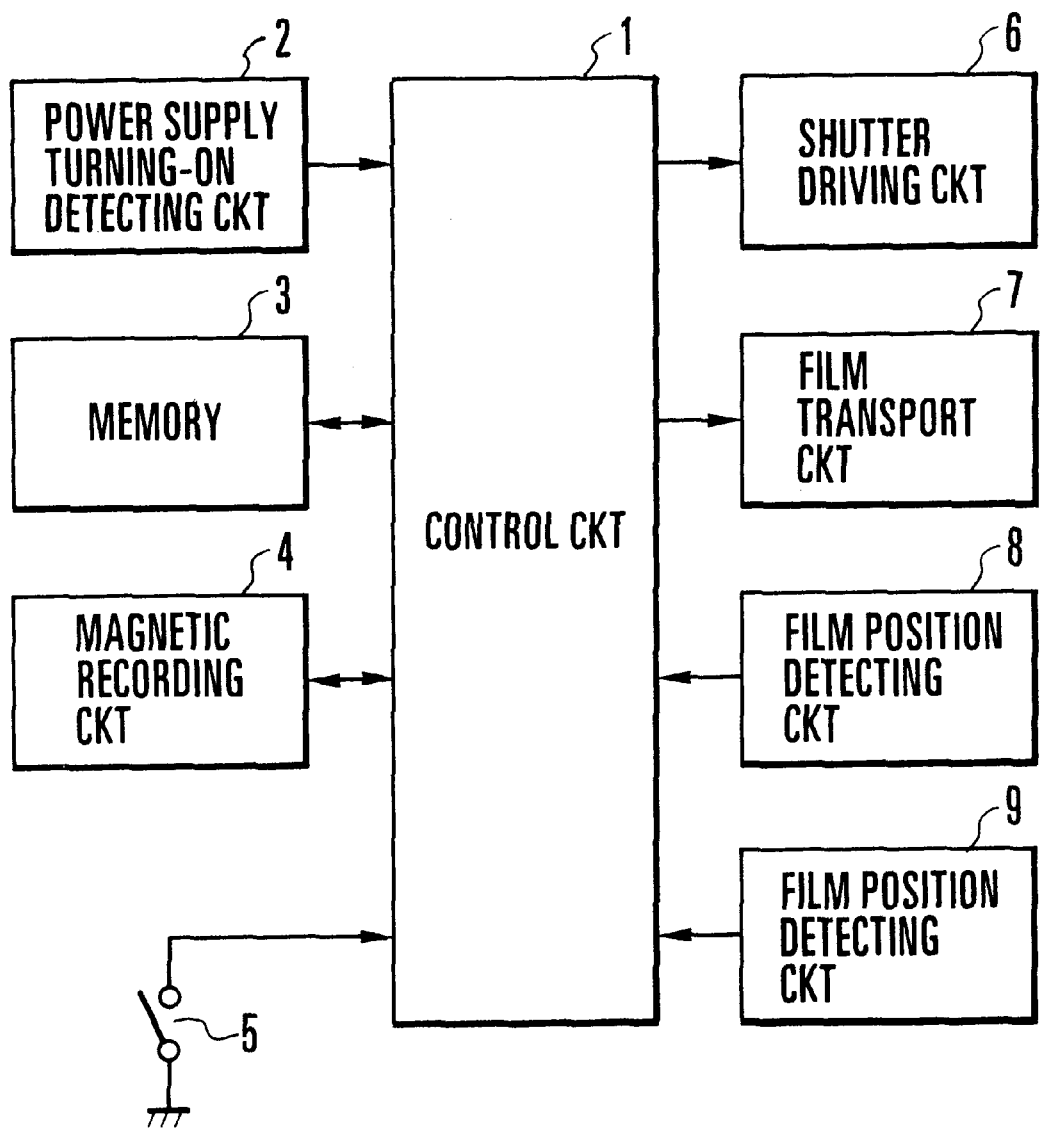
FIG. 1 is a block diagram showing a control system of a camera which is arranged according to this invention as a first embodiment thereof.

FIG. 1 is a block diagram showing a control system of a camera which is arranged according to this invention as a first embodiment thereof. As shown, the control system includes a control circuit 1 which is a main part of the control system and uses a microcomputer. The control circuit 1 is connected to a power supply turning-on detecting circuit 2, a memory 3, a magnetic recording circuit 4, a switch 5, a shutter driving circuit 6, a film transport circuit 7, a first film position detecting circuit 8 and a second film position detecting circuit 9.

The power supply turning-on detecting circuit 2 is arranged to detect that a battery or the like employed as a power supply is set within the camera and to send information on the setting of the battery to the control circuit 1 in such a way as to reset the control circuit 1 and also to cancel the reset state of the control circuit 1. An EEPROM (electrically erasable programmable read only memory) or the like is employed as the memory 3 and is arranged to store information of varied kinds and control flags for a sequence of actions. The magnetic recording circuit 4 includes a writing head, a driver, etc., and is arranged to be used for writing information into a magnetic recording area of a film. The switch 5 is arranged to cause the camera to perform a shutter release action. The shutter driving circuit 6 includes a shutter coil, a driver, etc. The film transport circuit 7 includes a motor and a driver which drives the motor.

The first film position detecting circuit 8 includes a photo-reflector, etc., and is arranged to detect a start position of the magnetic recording area on the film according to the perforations of the film. The second film position detecting circuit 9 includes a photo-reflector, etc., and is arranged to detect a transport ending position where the transport of one frame of the film is ended, according to the film perforations.

The main routine operation of the embodiment which is arranged in this manner is described with reference to the flow chart of FIG. 2 as follows.

At a step S201, when turning-on of the power supply is detected by the power supply turning-on detecting circuit 2, a reset canceling signal is sent out. The control circuit 1 then begins to operate on the basis of the reset canceling signal. At a step S202, a process is executed for an action following turning-on of power supply. The details of this process will be described later with reference to another flow chart of FIG. 6. After this process, the switch 5 turns on when a release operation is performed by the operator of the camera. At a step S203, a check is made to find if the switch 5 is in its on-state. If so, the flow comes to a step S204. At the step S204, a shutter control action is performed. This step is executed to cause the shutter driving circuit 6 to control an exposure to light of the film. The details of the step S204 will be described later also with reference to a flow chart of FIG. 3.

At a step S205, upon completion of the exposure control, the film transport circuit 7 is caused to carry out a film winding action. The details of this step will be described later herein with reference a flow chart of FIG. 4. Upon completion of the film winding for one frame, the flow of operation comes back to the step S203 to repeat the steps described above.

Figure 2:
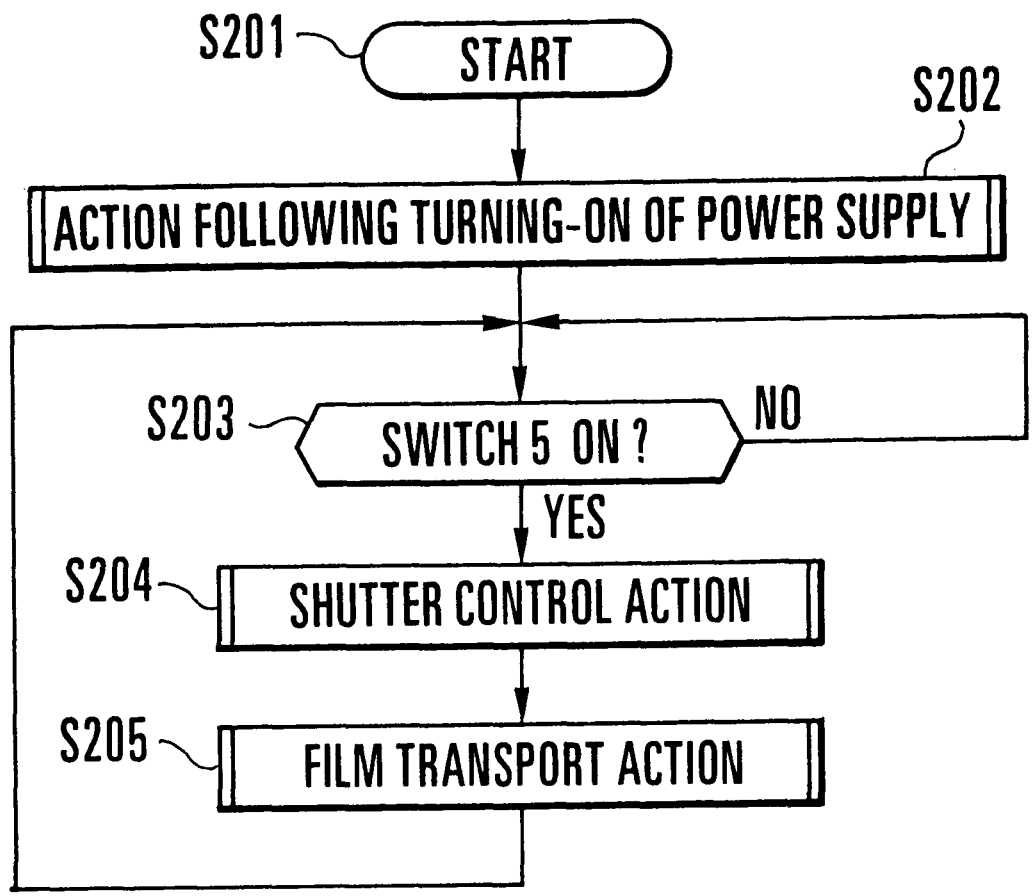
FIG. 2 is a flow chart showing the overall operation of the embodiment of this invention.
Figure 3:
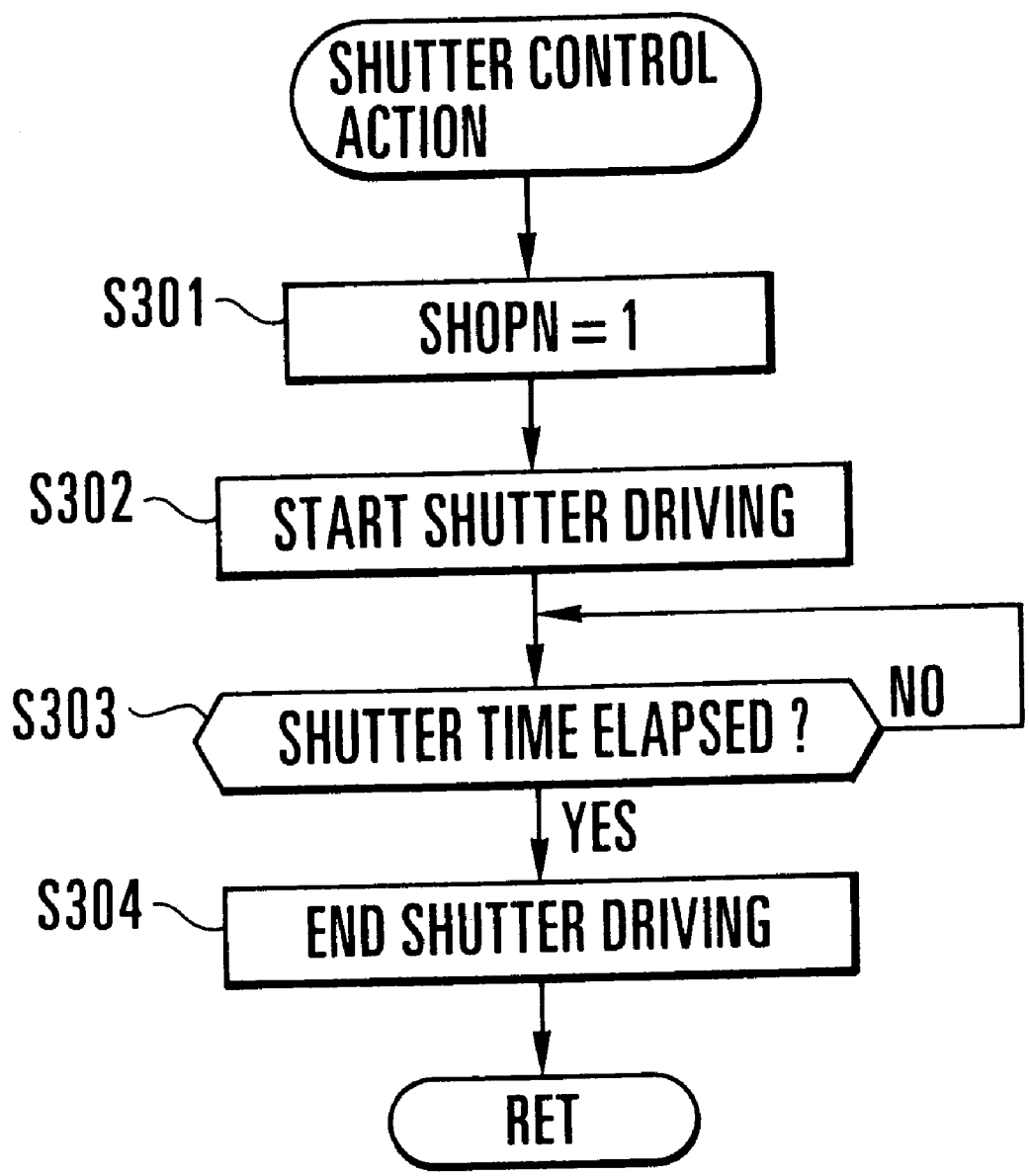
FIG. 3 is a flow chart showing the details of a shutter control action shown in FIG. 2.

FIG. 3 is a flow chart showing the details of the shutter control action of the step S204 of FIG. 2.

Referring to FIG. 3, the shutter control action is executed as follows. At a step S301, the control circuit 1 first sets a flag SHOPN at "1" (SHOPN=1). By this action, information indicating that an exposure action has been initiated is stored in the memory 3 even where the power supply happens to be caused to turn off by an occurrence of drop-off of the battery or the like. At a step S302, the control circuit 1 causes the shutter driving circuit 6 to drive the shutter. An exposure action thus begins. At a step S303, the flow of operation waits for the lapse of a shutter time decided by an exposure computing circuit (not shown). At a step S304, the shutter driving action is brought to an end when the shutter time comes to an end. The flow of operation then comes back (RET) to the step S205 of FIG. 2.

Figure 4:
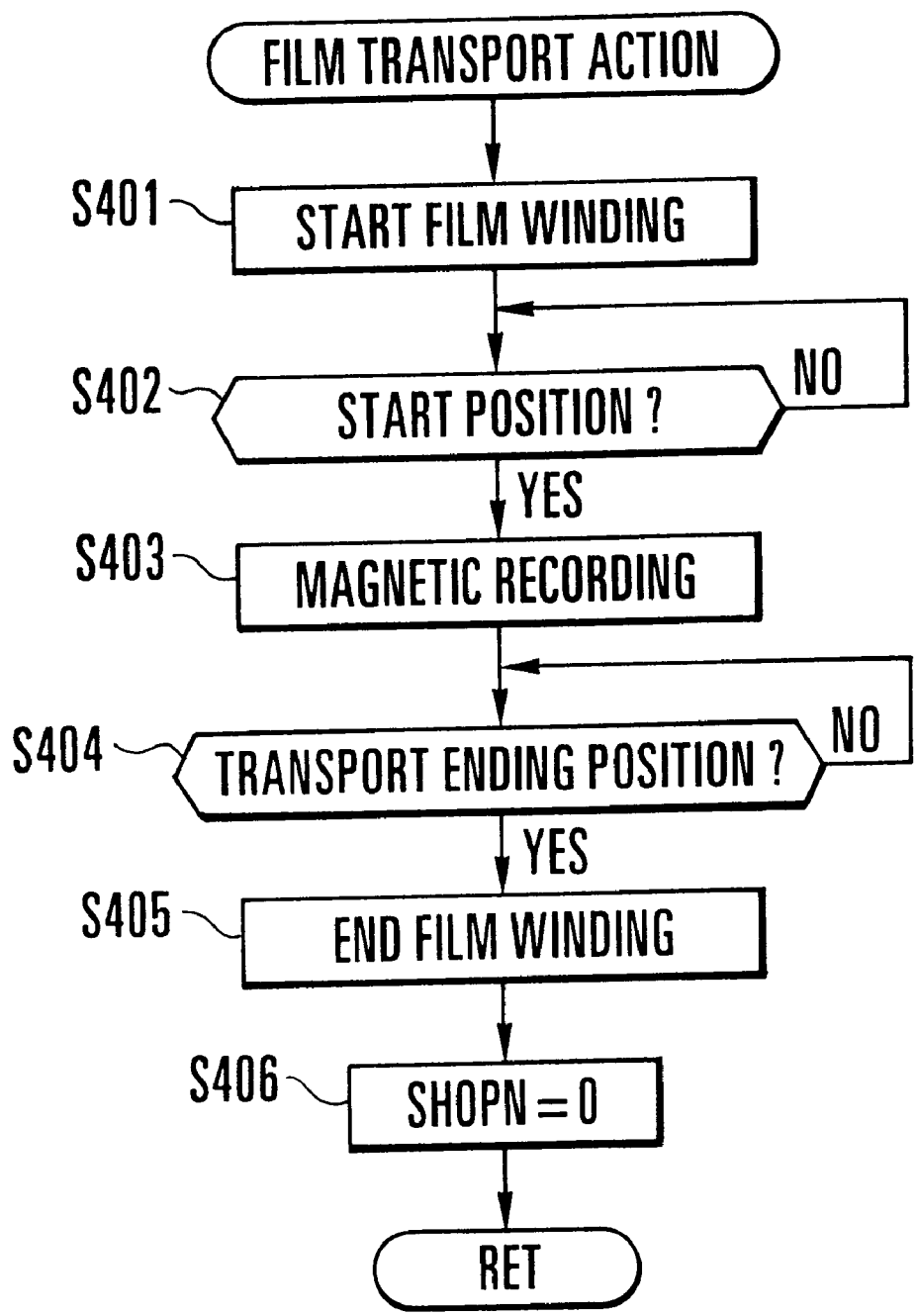
FIG. 4 is a flow chart showing the details of a film transport action shown in FIG. 2.

Referring to FIG. 4 which shows in a flow chart the details of the film transport action of the step S205 of FIG. 2.

At a step S401, the control circuit 1 causes the film transport circuit 7 to begin a film winding action. At a step S402, a check is made on the basis of a signal outputted from the first film position detecting circuit 8 to find if the film has been transported to a start position where a magnetic recording area begins. If so, the flow comes to a step S403. At the step S403, the control circuit 1 causes the magnetic recording circuit 4 to begin writing photo-taking (or shooting) information on the film.

At a step S404, a check is made on the basis of a signal outputted from the second film position detecting circuit 9 to find if the transport of one frame of the film has been ended, i.e., if a transport ending position has been reached. If so, the flow of operation comes to a step S405 to bring the film winding action to an end by stopping the film transport circuit 7 from driving. At a step S406, the control circuit 1 sets the flag SHOPN within the memory 3 at "0" (SHOPN= 0), which indicates an end of the film transport action. Upon completion of this process, the flow returns to the step S203 of FIG. 2.

Figure 5:
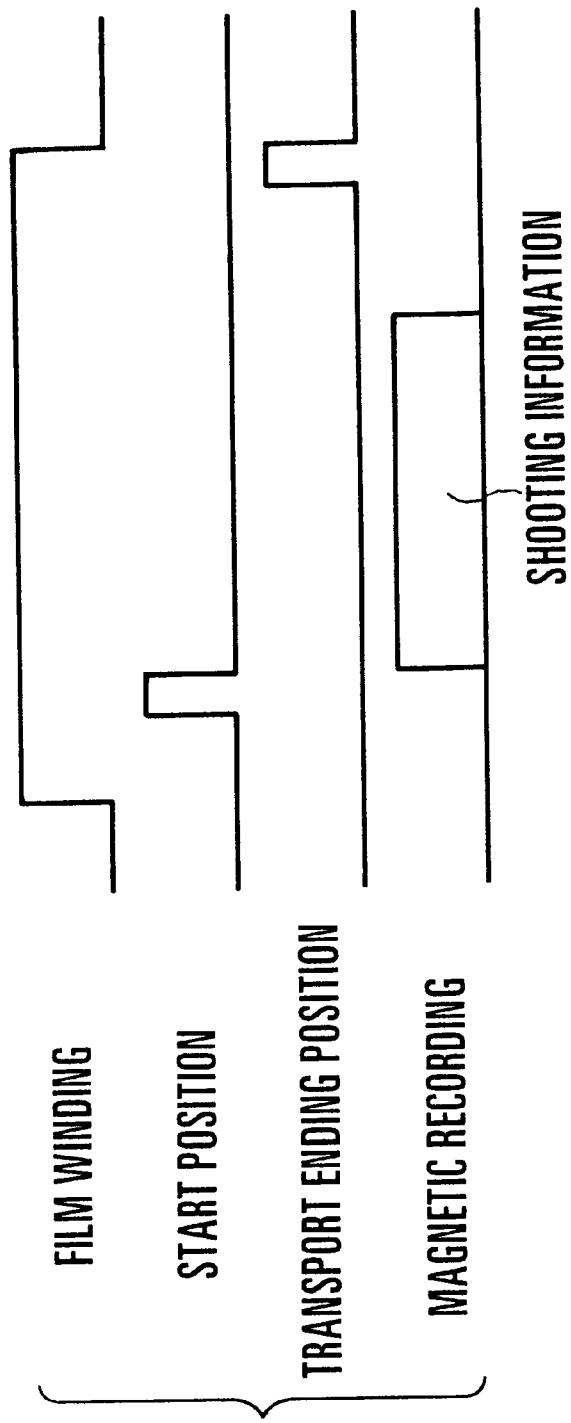
FIG. 5 is a timing chart showing a film winding signal, a start position signal, a transport ending position signal and a magnetic recording signal at the time of the film transport action, in relation to each other.

FIG. 5 is a timing chart showing signals related to the film transport action, including a film winding signal, a start position signal, a transport ending position signal and a magnetic recording signal, in relation to each other. The start position signal is outputted after the film winding signal. The photo-taking information begins to be recorded at a point where the start position signal falls. The recording proceeds accordingly as the film is transported. The photo-taking information recording process comes to an end when the magnetic recording area of the film passes the writing position with the film transported further. After the end of recording, the transport ending position signal is outputted. The film winding signal ceases to be sent out at a point of time where the transport ending position signal falls.

The details of the action following turning-on of power supply to be performed at the step S202 of FIG. 2 are next described with reference to FIG. 6 which is a flow chart as follows.

At a step S601, the flag SHOPN in the memory 3 is first read out to make a check for its content. This step is provided for finding if the power supply turns off to suspend a sequence of camera actions, due to a drop-off of the battery or a drop of the output level of the battery to a level below a predetermined level, before the end of the film transport action after the commencement of an exposure. If not, the flag SHOPN is at "0" and then the flow returns to the step S203 of FIG. 2. If the flag SHOPN is found to be at "1", on the other hand, it indicates an occurrence of drop-off of the battery and the flow comes to a step S602. At the step S602, film rewinding begins. The film rewinding action is performed by driving the film transport circuit 7.

In this instance, if the point of time at which the drop-off of the battery or the like takes place is between the steps S402 and S405 of FIG. 4, the film rewinding action is allowed to continue until the start position signal comes to be no longer detected at a step S604 after the start position signal of the film position detecting circuit 8 is detected at a step S603. After that, film rewinding is carried on until the transport ending position signal from the film position detecting circuit 9 is detected.

At a step S605, when the transport ending position signal is detected, the flow of operation comes to a step S606. At the step S606, the film transport circuit 7 is caused to bring the film rewinding action to an end. At a step S607, a film winding action begins. At a step S608, the magnetic recording is performed. At a step S609, a check is made for the start position signal while the magnetic recording is still in process.

In the case of a normal shutter release action, the magnetic recording is allowed to begin after the start position is detected during the process of film transport as shown in FIG. 4. However, in the action following turning-on of power supply, the magnetic recording is allowed to begin before the start position is detected after the film winding is started, for the purpose of preventing any magnetic recording information recorded before a battery drop-off from being left on the film, because the film transport speed after the battery drop-off might differ from the film transport speed before the drop-off.

When the start position signal is detected by the step S609, the flow comes to a step S610 to perform the magnetic recording. At a step 611, a check is made for the transport ending position signal while the magnetic recording is in process. In the normal shutter release action, the transport ending position signal is detected after completion of the magnetic recording action on the photo-taking information while the film transport is still in process as shown in FIGS. 4 and 5. However, in the action following turning-on of power supply, the magnetic recording action is allowed to continue until the transport ending position signal is detected, for the purpose of preventing any magnetic information recorded before a battery drop-off from being left on the film, because the film transport speed after the battery drop-off might differ from the film transport speed before the drop-off.

When the transport ending position signal is detected by the step S611, the flow comes to a step S612 to bring the film winding action to an end. At a step S613, the flag SHOPN in the memory 3 is set at "0" and the flow returns to the step S203 of FIG. 2.

Figure 6:
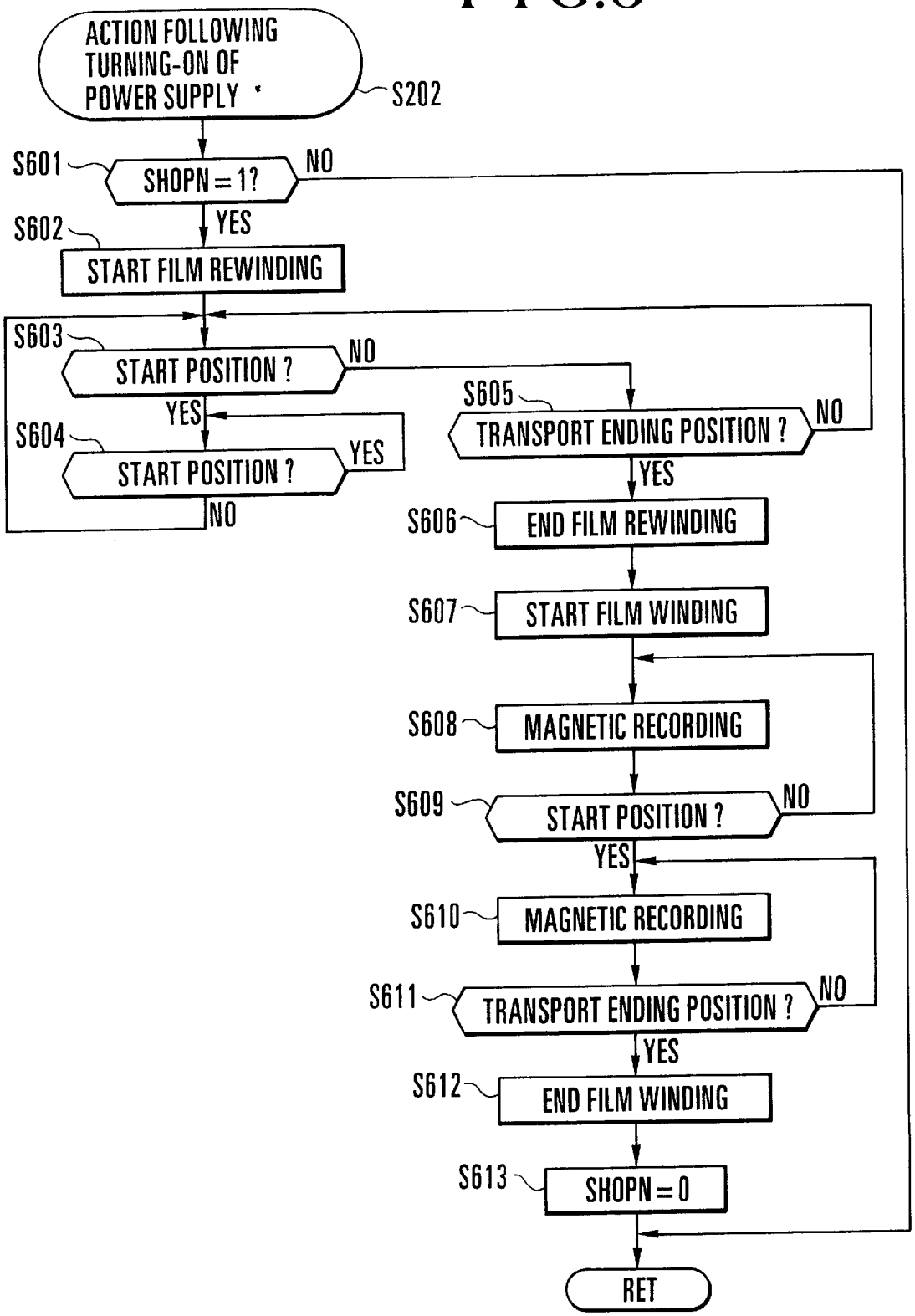
FIG. 6 is a flow chart showing the details of an action following turning-on of power supply shown in FIG. 2.
Figure 7:
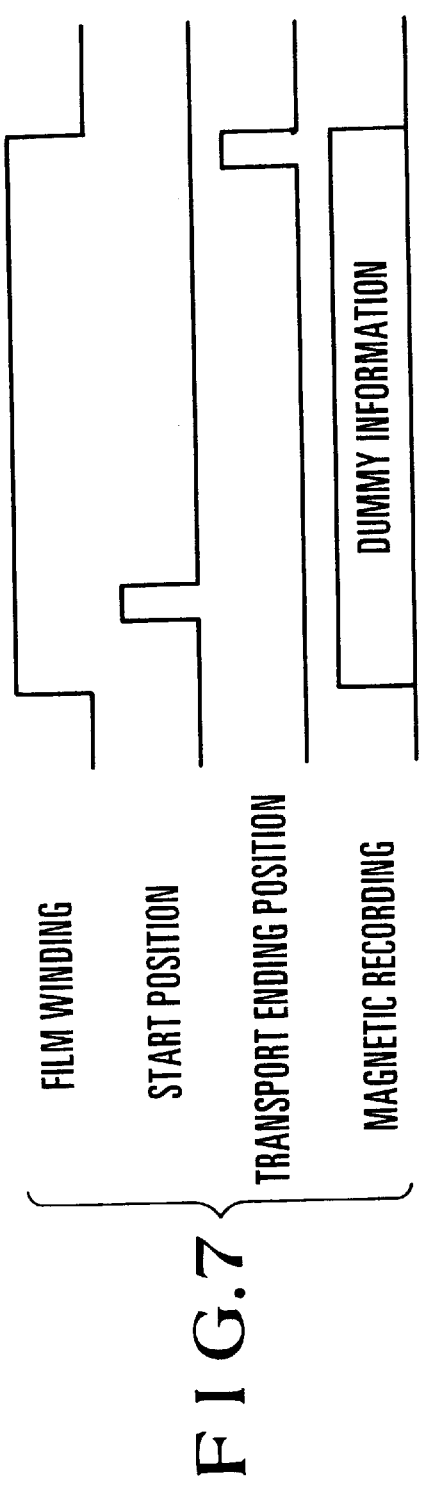
FIG. 7 is a timing chart showing, in relation to each other, a film winding signal, a start position signal, a transport ending position signal and a magnetic recording signal obtained in the operation of FIG. 6.

FIG. 7 is a timing chart showing signals related to the processes of FIG. 6, including the film winding signal, the start position signal, the transport ending position signal and the magnetic recording signal, in relation to each other. Magnetic recording begins at the same time that the film winding signal rises. However, since the photo-taking information has been caused to disappear by the drop-off of power supply, the information is recorded in the form of all "0" or "1" as "dummy information", in this case. The start position signal is sent out during the process of the magnetic recording. When the transport ending position signal is generated, each of the film winding signal and the magnetic recording signal comes to an end in synchronism with the fall of the transport ending position signal.

In accordance with the arrangement of the first embodiment described above, if the battery or the like happens to drop off while a shutter release action is still in process, when the power supply is again turned on, the turning-on of the power supply is detected by the flag within the memory 3. Then, the film is rewound back to a film transport ending position and is then wound up to an extent corresponding to one frame. As a result, the magnetic recording can be done all over again from its beginning without causing any double exposure. Therefore, dummy information can be recorded to leave no information recorded before the occurrence of the drop-off. Exposed frames (used for photo-taking) thus can be accurately detected by reading out the magnetic record of information.

While the first embodiment is arranged to decide, on the basis of the flag SHOPN, whether or not the camera is still in a shutter release process, this point of arrangement is changed in a second embodiment of this invention. The second embodiment is arranged as follows.

The photo-taking information to be magnetically recorded is stored in the memory 3 at a step which correspond to the step S301 of FIG. 3. Then, at steps corresponding to the step S406 of FIG. 4 and the step S613 of FIG. 6, the photo-taking information is cleared in the memory 3. Therefore, the camera can be decided as to whether it is still in a shutter release process, by making a check for the cleared state of the memory 3 at the step S601 of FIG. 6. Further, at the step S610 of FIG. 6, photo-taking information is recorded in place of the dummy information.

Further, while the first embodiment is arranged to allow the magnetic recording to begin immediately after the commencement of film winding at the step S608 of FIG. 6, the second embodiment is arranged to allow the magnetic recording to begin at the rising edge of the start position signal, because the film transport speed is not stable immediately after the commencement of film winding.

Figure 8:
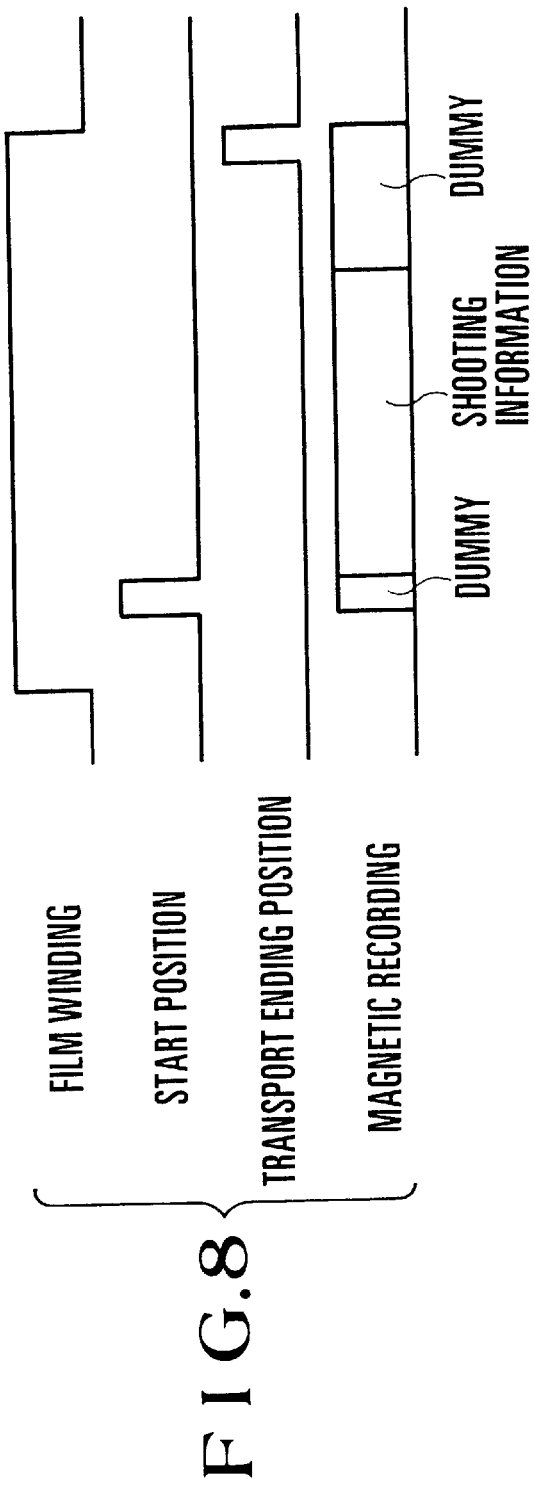
FIG. 8 is a timing chart showing, in relation to each other, a film winding signal, a start position signal, a transport ending position signal and a magnetic recording signal of a camera which is a second embodiment of this invention.

FIG. 8 is a timing chart showing signals related to the steps S607 to S612 of the second embodiment, including the film winding signal, the start position signal, the transport ending position signal and the magnetic recording signal, in relation to each other. Referring to FIG. 8, the start position signal comes after the film winding signal is issued. The magnetic recording begins in synchronism with the start position signal. In this case, dummy information is recorded before and after the photo-taking information. The recording action comes to an end and the film winding action also comes to an end when the transport ending position signal is outputted.

The second embodiment is thus arranged to decide whether or not the camera is in process of a shutter release action according to the presence or absence of photo-taking data within the memory 3 and also to be capable of magnetically recording photo-taking data. The dummy information can be recorded when the film transport speed stabilizes before and after the photo-taking data, so that recording can be accurately carried out. Further, the memory 3 may be arranged to store data indicating whether the camera is in process of the release action in addition to the photo-taking data.

A third embodiment of this invention is arranged to set a magnetic recording start flag of the memory 3 at "1" between the steps S402 and S403 of FIG. 4, to set a magnetic recording end flag at "1" between the steps 403 and 404, and to set the magnetic recording start flag and the magnetic recording end flag respectively at "0" between the steps S406 and the return (RET).

This arrangement enables the camera to find when a power supply drop-off has occurred during the process of the release action and to bring the film transport action to an end without rewinding the film if the magnetic recording end flag is at "1", even while the flag SHOPN is at "1" in the action following turning-on of power supply. This arrangement effectively prevents the power supply battery from being wasted. Further, since the dummy information data before and after the photo-taking information data are not necessary if the magnetic recording start flag is at "0", the electric energy can be saved also in this respect.

In each of the embodiments described, the arrangement of detecting the start position and the film transport ending position by means of the film position detecting circuits 8 and 9 can be made in accordance with, for example, Japanese Laid-Open Patent Application No. SHO 6-332065. According to that application, as shown in FIG. 9, photo-couplers 14a and 14b are arranged to detect first and second perforations 17b and 17c which are provided in each frame portion of the film. More specifically, the start position is detected with a passing motion of the perforation 17b detected by the photo-coupler 14b at the commencement of a film transport action. With the start position thus detected, a magnetic head 12 is caused to begin magnetic recording. The film transport ending position is detected with the perforation 17b of the next frame detected by the photocoupler 14a.

While each of the embodiments described is arranged to use a film as a recording medium, the invention is applicable also to an image recording medium other than the film.

The invention is applicable to cameras of varied kinds, such as a single-lens reflex camera, a lens-shutter type camera, a video camera, etc., optical apparatuses other than cameras, other apparatuses, devices adapted for cameras, optical apparatuses and other apparatuses, and component elements forming these apparatuses and devices.

What is claimed is:

1. A camera arranged to transport a film to a next frame after taking a shot for each frame, comprising:
    a) a decision circuit for determining a sequence state of the camera when a battery is stowed in the camera, said decision circuit judging whether the sequence state of the camera is a state between a start of exposure of a current frame to a completion of transporting the current frame; and
    b) a film transport control circuit which performs a first or second transport operation when the camera is detected by the decision circuit to be in a sequence state between start of exposure of the current frame and completion of transport of the current frame, said first transport operation being performed when the sequence state of the camera is after the start of the transport of the current frame but before the completion of the transport of the current frame, and said first transport operation comprising a first process to return the frame to an exposure position before the start of the transport and a second process to perform the transport of the frame and transport a next frame to the exposure position, wherein the second transport operation is performed when the sequence state of the camera is a state before the start of the transport of the current frame by effecting immediately the second process of the first transport operation without effecting the first process.

2. A camera according to claim 1, wherein the camera has a shoot control circuit which is arranged to allow a shooting action to begin without transporting the film when the sequence state of the camera is determined by the decision circuit to be a state in which the transport of the film is completed.

3. A camera according to claim 1, wherein said decision circuit includes a non-volatile memory for storing a sequence state which the camera has when a sequence of the camera is suspended by the battery being dropped to a level below a predetermined level or when the battery is replaced, and said decision circuit is arranged to determine the sequence state of the camera on the basis of a content of said memory.

4. A camera arranged to transport a film to a next frame after taking a shot for each frame and, while the film is being transported to the next frame, to record shooting information data in a magnetic recording part provided at each frame used for shooting, comprising:

a) a decision circuit for determining a sequence state of the camera when a battery is stowed in the camera, said decision circuit being arranged to determine whether the sequence state of the camera is a state before completion of transport of the film after commencement of an exposure for a current frame; and b) a recording circuit arranged to cause dummy data different from said shooting information data, in replacement of the shooting information data to be recorded in the magnetic recording part of said frame of the film when the sequence state of the camera is determined by said decision circuit to be a state before completion of transport of the film after commencement of the exposure for said frame.

5. A camera arranged to transport a film to a next frame after taking a shot for each frame and, while the film is being transported to the next frame, to record shooting information data in a magnetic recording part provided at each frame used for shooting, comprising:

a) a decision circuit for determining a sequence state of the camera when a battery is stowed in the camera, wherein said decision circuit determines whether the sequence state of the camera is a state between a start of exposure of a frame and completion of transporting said frame;

b) a film transport and shooting control circuit arranged to transport the film to a transport ending position for said frame if the sequence state of the camera is determined by said decision circuit to be a state between a start of exposure of said frame and completion of transporting said frame and, after that, to allow a shooting action to begin; and c) a recording circuit arranged to cause dummy data different from said shooting information data to be recorded in the magnetic recording part of said frame when the sequence state of the camera is determined by said decision circuit to be a state between a start of exposure of said frame and completion of transporting said frame.

* * * * *